(12) United States Patent
Omuro

(10) Patent No.: US 11,336,793 B2
(45) Date of Patent: May 17, 2022

(54) SCANNING SYSTEM FOR GENERATING SCAN DATA FOR VOCAL OUTPUT, NON-TRANSITORY COMPUTER-READABLE STORAGE MEDIUM STORING PROGRAM FOR GENERATING SCAN DATA FOR VOCAL OUTPUT, AND METHOD FOR GENERATING SCAN DATA FOR VOCAL OUTPUT IN SCANNING SYSTEM

(71) Applicant: SEIKO EPSON CORPORATION, Tokyo (JP)

(72) Inventor: Makoto Omuro, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/194,341

(22) Filed: Mar. 8, 2021

(65) Prior Publication Data
US 2021/0289086 A1   Sep. 16, 2021

(30) Foreign Application Priority Data
Mar. 10, 2020   (JP) .............................. JP2020-040699

(51) Int. Cl.
*H04N 1/32*   (2006.01)
*H04N 1/00*   (2006.01)

(52) U.S. Cl.
CPC ..... *H04N 1/32101* (2013.01); *H04N 1/00331* (2013.01); *H04N 1/00336* (2013.01); *H04N 1/00488* (2013.01); *H04N 2201/3226* (2013.01); *H04N 2201/3264* (2013.01); *H04N 2201/3266* (2013.01)

(58) Field of Classification Search
CPC .......... H04N 1/32101; H04N 1/00488; H04N 1/00331; H04N 1/00336; H04N 2201/3264; H04N 2201/3266; H04N 2201/3226; H04N 2201/0416
See application file for complete search history.

(56) References Cited

U.S. PATENT DOCUMENTS

2002/0196479 A1\* 12/2002 Simske .............. H04N 1/00795
358/474
2004/0174434 A1\* 9/2004 Walker ............... H04N 1/32128
348/211.3

(Continued)

FOREIGN PATENT DOCUMENTS

JP   2006-163288 A   6/2006

*Primary Examiner* — Nicholas Pachol
(74) *Attorney, Agent, or Firm* — Global IP Counselors, LLP

(57) ABSTRACT

A multi-function printer includes a generating section, an image recognition section, a speaking section, and a transmitting section. The generating section scans an original document to generate scan data. The image recognition section performs image recognition on the scan data. The speaking section causes a word corresponding to a recognition result of the image recognition section and corresponding to a drawing, a photograph, or the like included in the original document to be spoken from a speaker circuit. The transmitting section transmits the scan data generated by the generating section to a specific destination when a specific operation is performed during speaking performed by the speaking section or within a certain period of time after completion of the speaking performed by the speaking section.

8 Claims, 10 Drawing Sheets

| IMAGE TEMPLATE | WORD | |
| --- | --- | --- |
| | WORD INDICATING IMAGE | WORD INDICATING IMAGE CATEGORY |
| IMAGE TEMPLATE A | TARO YAMADA | PERSON |
| IMAGE TEMPLATE B | HANAKO SUZUKI | PERSON |
| IMAGE TEMPLATE C | LINE GRAPH | GRAPH |
| IMAGE TEMPLATE D | BAR GRAPH | GRAPH |
| IMAGE TEMPLATE E | LASER PRINTER | APPLIANCE |
| IMAGE TEMPLATE F | SHIBA INU | DOG |

(56) References Cited

U.S. PATENT DOCUMENTS

| | | | |
|---|---|---|---|
| 2006/0114514 A1* | 6/2006 | Rothschild | H04N 1/2191 358/3.28 |
| 2007/0297786 A1* | 12/2007 | Pozniansky | G11B 27/322 396/310 |
| 2013/0314566 A1* | 11/2013 | Walker | H04N 5/77 348/231.3 |
| 2014/0040828 A1* | 2/2014 | Choi | G06F 16/5866 715/835 |
| 2014/0285679 A1* | 9/2014 | Saitou | H04N 5/772 348/211.4 |
| 2015/0116511 A1* | 4/2015 | Takahashi | H04N 1/00156 348/207.11 |
| 2018/0035074 A1* | 2/2018 | Barnes, Jr. | H04N 21/8106 |
| 2018/0096201 A1* | 4/2018 | Bermundo | G06F 3/1222 |
| 2018/0150433 A1* | 5/2018 | Sowden | H04N 1/00185 |
| 2018/0196587 A1* | 7/2018 | Bialynicka-Birula | G06T 3/0093 |
| 2019/0005315 A1* | 1/2019 | Barros | H04N 5/23219 |
| 2019/0130169 A1* | 5/2019 | Zeng | H04N 1/32 |
| 2021/0166677 A1* | 6/2021 | Yamamoto | G06F 3/167 |

\* cited by examiner

| IMAGE TEMPLATE | WORD | |
| --- | --- | --- |
| | WORD INDICATING IMAGE | WORD INDICATING IMAGE CATEGORY |
| IMAGE TEMPLATE A | TARO YAMADA | PERSON |
| IMAGE TEMPLATE B | HANAKO SUZUKI | PERSON |
| IMAGE TEMPLATE C | LINE GRAPH | GRAPH |
| IMAGE TEMPLATE D | BAR GRAPH | GRAPH |
| IMAGE TEMPLATE E | LASER PRINTER | APPLIANCE |
| IMAGE TEMPLATE F | SHIBA INU | DOG |

SCANNING SYSTEM FOR GENERATING SCAN DATA FOR VOCAL OUTPUT, NON-TRANSITORY COMPUTER-READABLE STORAGE MEDIUM STORING PROGRAM FOR GENERATING SCAN DATA FOR VOCAL OUTPUT, AND METHOD FOR GENERATING SCAN DATA FOR VOCAL OUTPUT IN SCANNING SYSTEM

The present application is based on, and claims priority from JP Application Serial Number 2020-040699, filed Mar. 10, 2020, the disclosure of which is hereby incorporated by reference herein in its entirety.

BACKGROUND

1. Technical Field

The present disclosure relates to a scanning system, a non-transitory computer-readable storage medium storing a program, and a method for generating scan data in the scanning system.

2. Related Art

JP-A-2006-163288 discloses a copying apparatus that optically reads an original document and causes characters included in the original document to be spoken, so that a user having a visual impairment is able to grasp the content of the original document.

When an original document including no characters is read by using the techniques mentioned above, the content of the original document is not able to be grasped.

SUMMARY

A scanning system according to the present disclosure includes a generating section that scans an original document to generate scan data, an image recognition section that performs image recognition on the scan data, and a speaking section that causes a word corresponding to a photograph, picture, or drawing corresponding to any of a photograph, a picture, and a drawing included in the original document to be spoken from a speaker circuit. The word corresponding to a photograph, picture, or drawing is a word corresponding to a recognition result of the image recognition section.

A non-transitory computer-readable storage medium storing a program according to the present disclosure causes a scanning system to execute a process. The process includes scanning an original document to generate scan data, performing image recognition on the scan data, and causing a word corresponding to a photograph, picture, or drawing corresponding to any of a photograph, a picture, and a drawing included in the original document to be spoken from a speaker circuit. The word corresponding to a photograph, picture, or drawing is a word corresponding to a recognition result of the image recognition.

A method for generating scan data in a scanning system, according to the present disclosure, includes scanning an original document to generate scan data, performing image recognition on the scan data, and speaking a word corresponding to a photograph, picture, or drawing corresponding to any of a photograph, a picture, and a drawing included in the original document to be spoken from a speaker circuit. The word corresponding to a photograph, picture, or drawing is a word corresponding to a recognition result of the image recognition.

A scanning system according to the present disclosure includes a generating section that scans an original document to generate scan data, an image recognition section that performs image recognition on the scan data, and a speaking section that causes a word not corresponding to a character or code to be spoken from a speaker circuit. The word not corresponding to a character or code is a word corresponding to a recognition result of the image recognition section and is neither a word corresponding to a character included in the original document nor a word corresponding to code included in the original document.

BRIEF DESCRIPTION OF THE DRAWINGS

FIG. 9, is a flowchart illustrating a flow of a scanning process.

FIG. 10, is a flowchart illustrating a flow of a scanning process.

DESCRIPTION OF EXEMPLARY EMBODIMENTS

Figure 1:
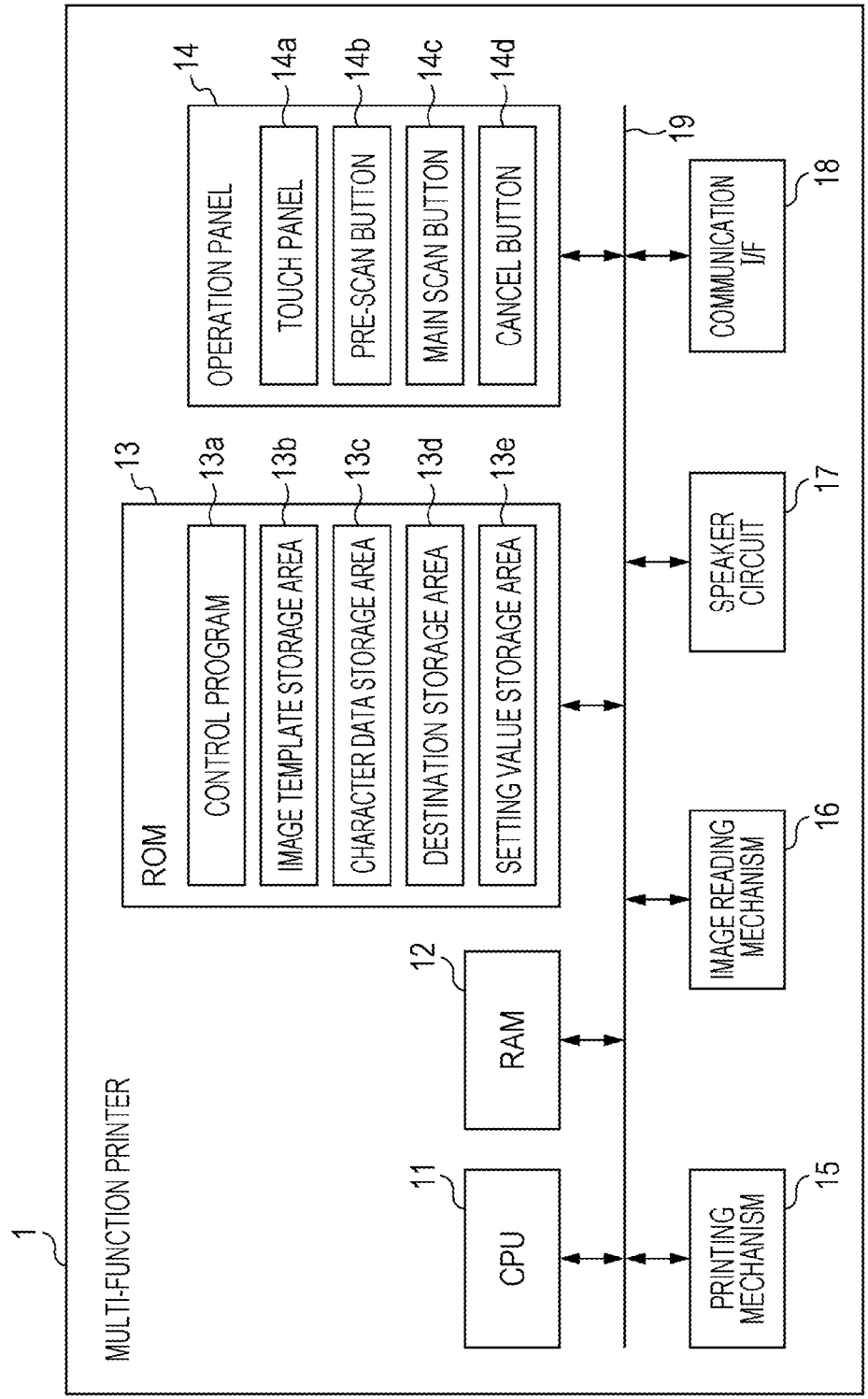
FIG. 1 is a block diagram illustrating a hardware configuration of a multi-function printer.

Hereinafter, a scanning system, a program, and a method for generating scan data in the scanning system according to an embodiment will be described with reference to the accompanying drawings. FIG. 1 is a block diagram illustrating a hardware configuration of a multi-function printer 1. The multi-function printer 1 is an example of the scanning system.

The multi-function printer 1 includes, as a hardware configuration, a central processing unit (CPU) 11, a random-access memory (RAM) 12, a read-only memory (ROM) 13, an operation panel 14, a printing mechanism 15, an image reading mechanism 16, a speaker circuit 17, and a communication interface 18. These components are coupled via a bus 19.

The CPU 11 loads various programs stored in the ROM 13 on the RAM 12 and thus controls components in the multi-function printer 1. A hardware circuit, such as an application specific integrated circuit (ASIC), may be used as a processor in place of the CPU 11. The processor may have a configuration in which one or more CPUs and a hardware circuit, such as an ASIC, operate in cooperation with each other.

The ROM 13, which is a nonvolatile recording medium, stores various programs and various types of data. For example, the ROM 13 stores a control program 13a. The control program 13a is firmware for the multi-function printer 1 to execute various processes. The CPU 11 executes a scanning process described later (refer to FIGS. 8 and 9) and a copying process, a printing process, and the like on the basis of the control program 13a. The multi-function printer 1 according to the present embodiment has a capability of reading the original document 50 aloud so that, in the scanning process, a user having a visual impairment is able to grasp the content of the original document 50 that the user is trying to scan. The capability of reading the original document 50 aloud is implemented when the CPU 11 performs image recognition on scan data obtained by scanning the original document 50 (refer to FIG. 7) and causes a word corresponding to an image recognition result to be spoken from the speaker circuit 17.

The phrase "word corresponding to an image recognition result" refers to a word obtained by performing image recognition on the scan data. The term "image recognition" refers to a process of automatically recognizing what is represented by an image in the scan data. For example, the term "image recognition" refers to causing the scan data to undergo an image matching process or an optical character recognition (OCR) process and may use artificial intelligence (AI). For example, the CPU 11 causes the scan data to undergo an image matching process and thus extracts, from images included in the scan data, an image corresponding to an image template stored in advance, and causes a word indicating the extracted image to be spoken from the speaker circuit 17. The CPU 11 also causes the scan data to undergo the OCR process and thus causes a word corresponding to characters included in the scan data to be spoken.

On the basis of the control program 13a, the CPU 11 also receives various settings for reading the original document 50 aloud. Various settings for reading the original document 50 aloud will be hereinafter referred to as read aloud settings. The read aloud settings will be described later with reference to, for example, FIG. 4.

The ROM 13 includes an image template storage area 13b, a character data storage area 13c, a destination storage area 13d, and a setting value storage area 13e. The image template storage area 13b is an example of a storage portion.

Figures 2, 3:
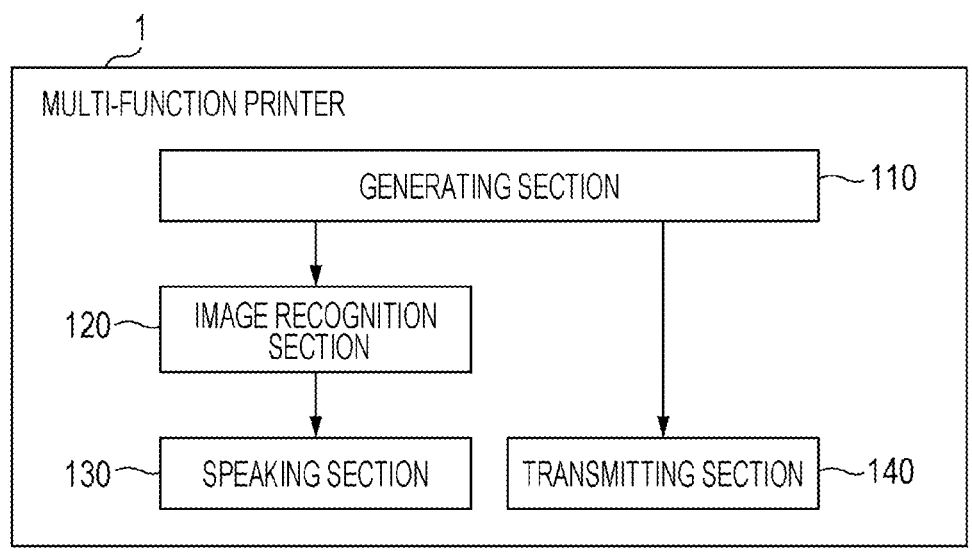
FIG. 2 is a diagram depicting an image template storage area.
FIG. 3 is a block diagram illustrating a functional configuration of a multi-function printer.

The image template storage area 13b stores image templates used for an image matching process and words in association with each other. The image template is an example of image data. FIG. 2 is a diagram depicting the image template storage area 13b. The image template storage area 13b stores a word indicating an image and a word indicating an image category, which are words to be associated with an image template. The word indicating an image category is a word indicating a category in which an item represented by an image represents falls when the image representing the item is sorted according to prescribed classification and is a word that is a higher level concept than the word indicating an image. The word indicating an image and the word indicating an image category each encompass a word not corresponding to a character or code, and the word not corresponding to a character or code encompasses a word corresponding to a photograph, picture, or drawing.

For example, the word indicating an image includes a word or a set of words indicating the name of a person. The image template storage area 13b stores, for every person, an image template of the face of the person and a word or a set of words indicating the name of the person in association with each other. In FIG. 2, "Image template A" and "Image template B" are image templates of the faces of persons. "Taro Yamada" and "Hanako Suzuki" are sets of words indicating the names of persons. The word "person", which is, for example, a word indicating an image category, is associated with a word or a set of words indicating the name of a person.

The word indicating an image also includes a word or a set of words indicating the type of a graph. The image template storage area 13b stores, for every graph type, the image template of a graph and a word or a set of words indicating the graph type in association with each other. In FIG. 2, "Image template C" and "Image template D" are image templates of graphs. "Line graph" and "bar graph" are sets of words indicating graph types. The word "graph", which is, for example, a word indicating an image category, is associated with a word or a set of words indicating a graph type. As words or sets of words indicating graph types, "pie chart", "band graph", "radar chart", and the like, other than "line graph" and "bar graph" depicted in FIG. 2, may be stored in the image template storage area 13b.

The image template storage area 13b also stores, as a word indicating an image, a generic term such as "laser printer" or "Shiba inu" other than a word or a set of words indicating a person name and a word or a set of words indicating a graph type. In FIG. 2, "Image template E" is the image template of a laser printer, and "Image template F" is the image template of a Shiba inu. For example, the word "appliance", which is, for example, a word indicating an image category, is associated with the word "laser printer". A plurality of words or sets of words "printer", "appliance", "electronic device", and the like, each of which is a word or a set of words indicating an image category, may be associated with the set of words "laser printer". Additionally, the word "dog", which is, for example, a word indicating an image category, is associated with the set of words "Shiba inu". A plurality of words or sets of words "dog", "animal", and the like, each of which is a word or a set of words indicating an image category, may be associated with the set of words "Shiba inu".

The character data storage area 13c stores character data used for an OCR process. The CPU 11 extracts characters corresponding to character data stored in the character data storage area 13c by performing the OCR process and causes the extracted characters to be spoken, as a word corresponding to an image recognition result, from the speaker circuit 17.

The destination storage area 13d stores the destination of scan data obtained by scanning the original document 50. In the present embodiment, the address of a specific storage area in an external device is stored as the destination of scan data. The specific storage area in the external device is an example of a specific destination. A personal computer (PC), a server, a printer, or the like is used as the external device.

The setting value storage area 13e stores the set values of the read aloud settings mentioned above. The set values of the read aloud settings will be hereinafter referred to as read-aloud-setting values.

The operation panel 14 includes a touch panel 14a, a pre-scan button 14b, a main scan button 14c, and a cancel button 14d.

The touch panel 14a presents various types of information to the user as well as receives various types of operations from the user. For example, the touch panel 14a displays a read-aloud-setting screen DA (refer to, for example, FIG. 4) described later and receives read aloud settings set by the user. The pre-scan button 14b is a button with which, in the scanning process, the user issues an instruction for performing a pre-scan. The term "pre-scan" refers to a scanning operation of the original document 50 for the multi-function printer 1 to read the original document 50 aloud. The main scan button 14c is a button with which, in the scanning process, the user issues an instruction for a main scan. The term "main scan" refers to a scanning operation of the original document 50 for finally obtaining scan data in the scanning process.

As described above, both the pre-scan and the main scan refer to scan operations of the same original document 50 but have different purposes. In the present embodiment, it is assumed that, in the pre-scan, scanning is performed at a first resolution, and, in the main scan, scanning is performed at a second resolution higher than the first resolution. Hereinafter, scan data obtained by a pre-scan will be referred to as pre-scan data, and scan data obtained by a main scan will be referred to as main scan data. The operation of the main scan button 14c is an example of a specific operation. The pre-scan data is an example of first scan data, and the main scan data is an example of second scan data.

Figure 8:
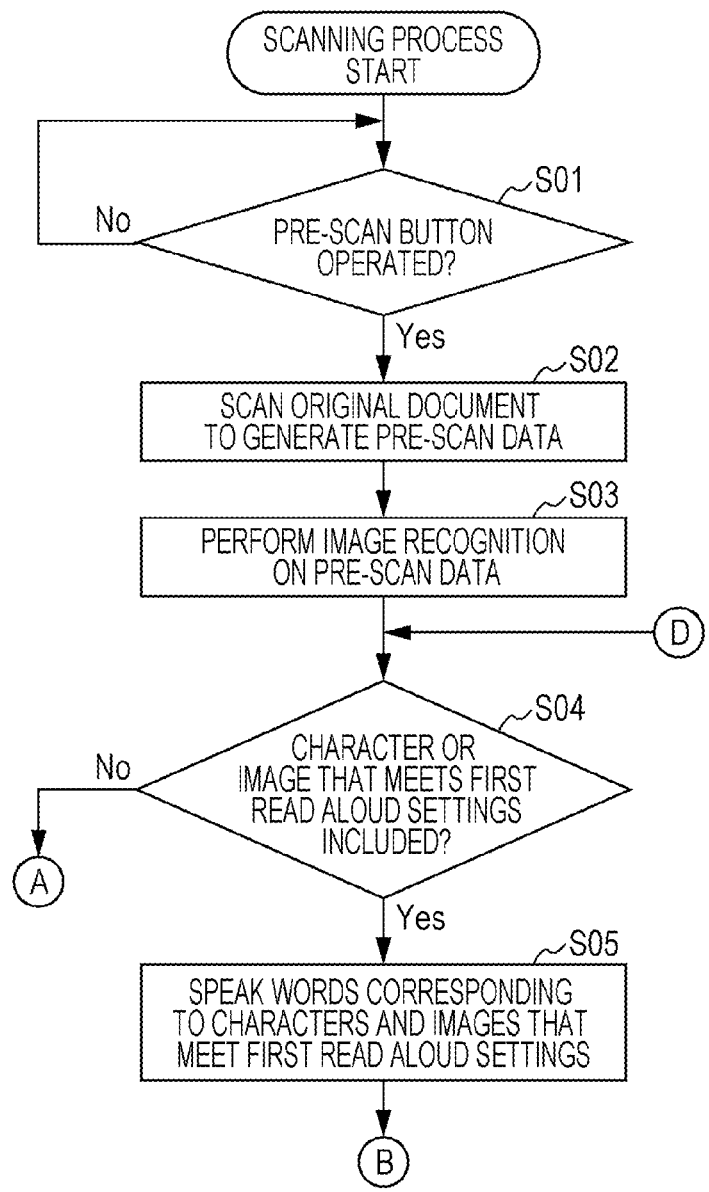
FIG. 8 is a flowchart illustrating a flow of a scanning process.
Figure 9:
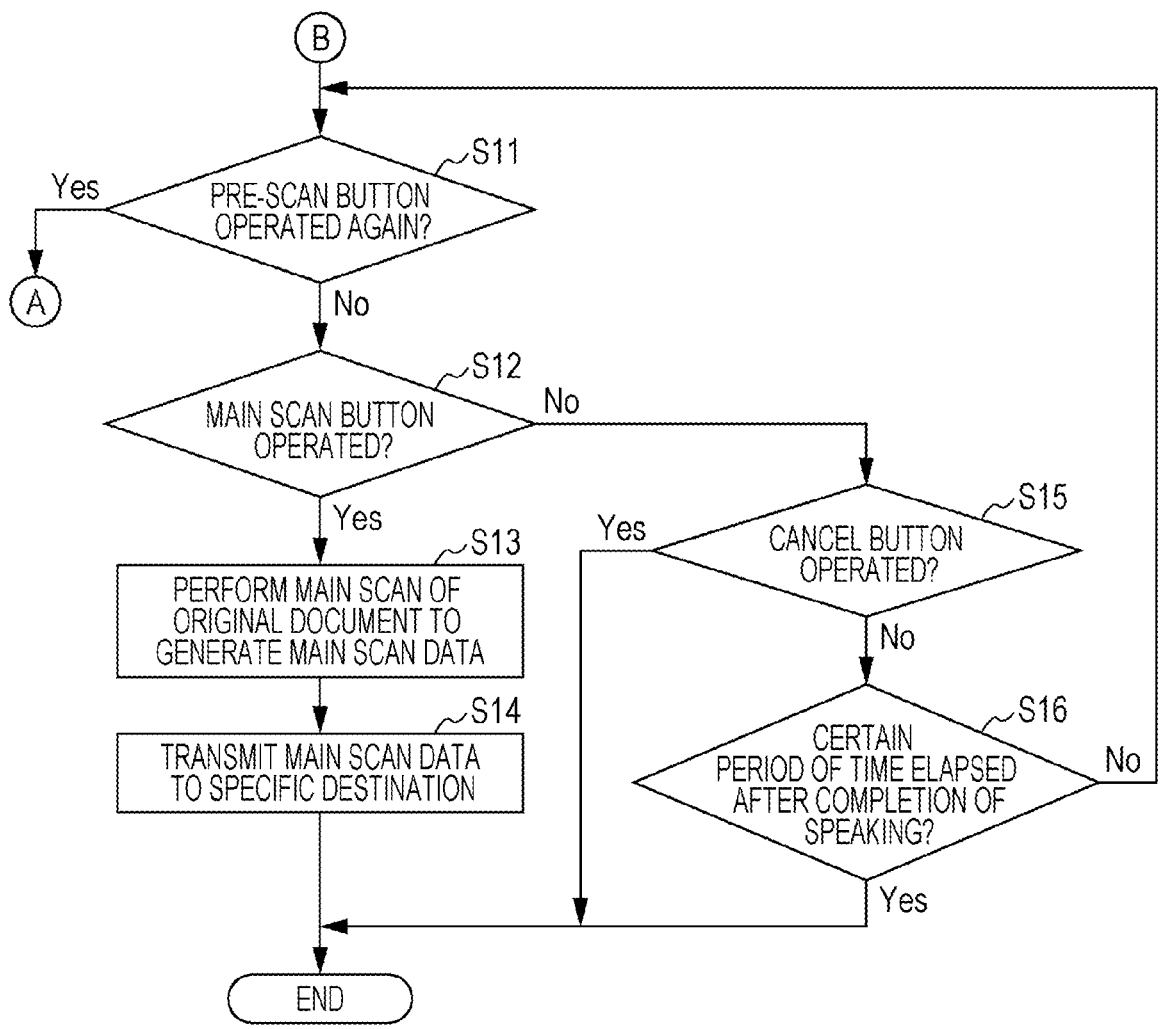
FIG. 9, which follows

The cancel button 14d is a button with which the user issues an instruction for cancelling a scanning process (refer to FIGS. 8 and 9).

The printing mechanism 15 performs printing on a printing medium, such as a sheet of printing paper. The image reading mechanism 16 reads the original document 50. The image reading mechanism 16 may employ either a sheet-feed method or a flatbed method. The image reading mechanism 16 is able to detect that the original document 50 is set on a platen or is removed from the platen.

The CPU 11 performs the printing process by operating the printing mechanism 15. The CPU 11 also performs the scanning process by operating the image reading mechanism 16. The multi-function printer 1 performs the copying process by operating the printing mechanism 15 and the image reading mechanism 16.

The speaker circuit 17 speaks a word. The CPU 11 converts a word corresponding to a recognition result of pre-scan data into voice and inputs the converted voice data to the speaker circuit 17. The speaker circuit 17 speaks a word by outputting voice based on the input voice data.

The communication interface 18 communicates with an external device (not illustrated) via a network, such as the Internet. When the CPU 11 is instructed to perform a main scan by the user through an operation of the main scan button 14c, the CPU 11 transmits main scan data to an external device via the communication interface 18.

With reference to FIG. 3, the functional configuration of the multi-function printer 1 will now be described. The multi-function printer 1 includes, as the functional configuration, a generating section 110, an image recognition section 120, a speaking section 130, and a transmitting section 140. These functions are implemented by the CPU 11 executing the control program 13a.

The generating section 110 generates scan data by scanning the original document 50 with the image reading mechanism 16. The generating section 110 generates pre-scan data according to an instruction for performing a pre-scan issued by the user and generates main scan data according to an instruction for performing a main scan.

The image recognition section 120 performs image recognition on the pre-scan data generated by the generating section 110. The image recognition section 120 recognizes the face of a person, the type of a graph, and the category of an image by performing the image matching process. The image recognition section 120 also recognizes characters by performing the OCR process.

The speaking section 130 causes a word corresponding to a recognition result of the image recognition section 120 to be spoken from the speaker circuit 17. For example, the speaking section 130 causes a word corresponding to characters recognized by the image recognition section 120 to be spoken from the speaker circuit 17.

The speaking section 130 also causes a word not corresponding to a character or code to be spoken from the speaker circuit 17. The word not corresponding to a character or code is a word that corresponds to a recognition result of the image recognition section 120 and that is neither a word corresponding to characters included in the original document 50 nor a word corresponding to code included in the original document 50. Here, the "characters included in the original document 50" include not only the characters that are recognizable to a user when the user visually observes the original document 50, but also the characters that are unrecognizable to the user, for example, hidden characters. The "code included in the original document 50" includes a barcode, a two-dimensional code, a color code, and the like. The phrase "word corresponding to code" refers to, for example, in the case of a barcode, a word included as coded information in the barcode, not a word "barcode".

The speaking section 130 also causes a word corresponding to a photograph, picture, or drawing to be spoken from the speaker circuit 17. The word corresponding to a photograph, picture, or drawing is a word that corresponds to a recognition result of the image recognition section 120 and that corresponds to any of a photograph, a picture, and a drawing included in the original document 50. Here, the term "photograph" refers to an image captured by a camera. The term "picture" refers to an image that depicts the shape of an object or a scene, such as a painting. The term "drawing" refers to an image that depicts the form and state of an object, such as a map, a figure, or a diagram.

For example, the speaking section 130 references the image template storage area 13b and causes a word or a set of words indicating the name of a person whose face has been recognized by the image recognition section 120 to be spoken as a word corresponding to a photograph, picture, or drawing included in a word not corresponding to a character or code from the speaker circuit 17. The speaking section 130 also causes a word or a set of words indicating the type of a graph recognized by the image recognition section 120 and a word or a set of words indicating an image category to be spoken as words corresponding to a photograph, picture, or drawing, each of which is included in a word not corresponding to a character or code, from the speaker circuit 17.

The transmitting section 140 transmits the main scan data generated by the generating section 110 to a specific destination when the main scan button 14c is operated within a certain period of time after completion of speaking performed by the speaking section 130. The transmitting section 140 transmits the main scan data to a destination stored in the destination storage area 13d.

Figure 4:
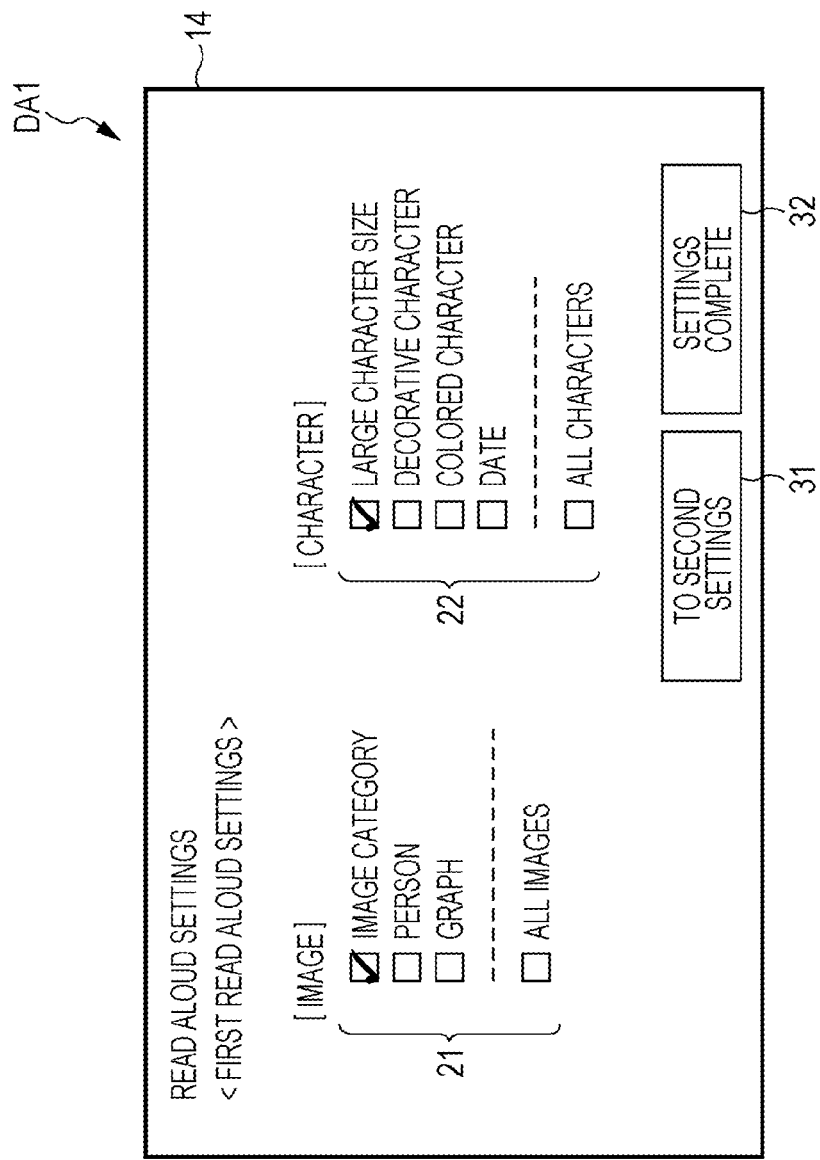
FIG. 4 is a diagram depicting a display example of a first setting screen.
Figure 5:
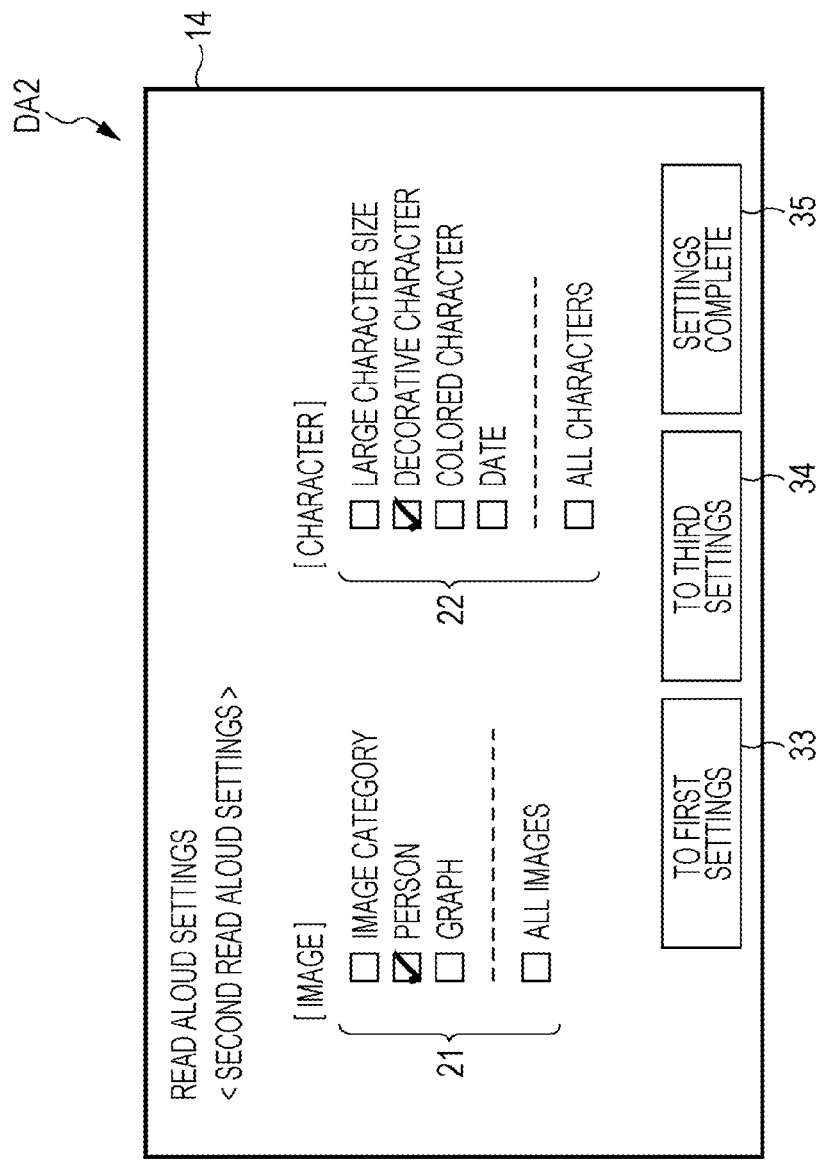
FIG. 5 is a diagram depicting a display example of a second setting screen.
Figure 6:
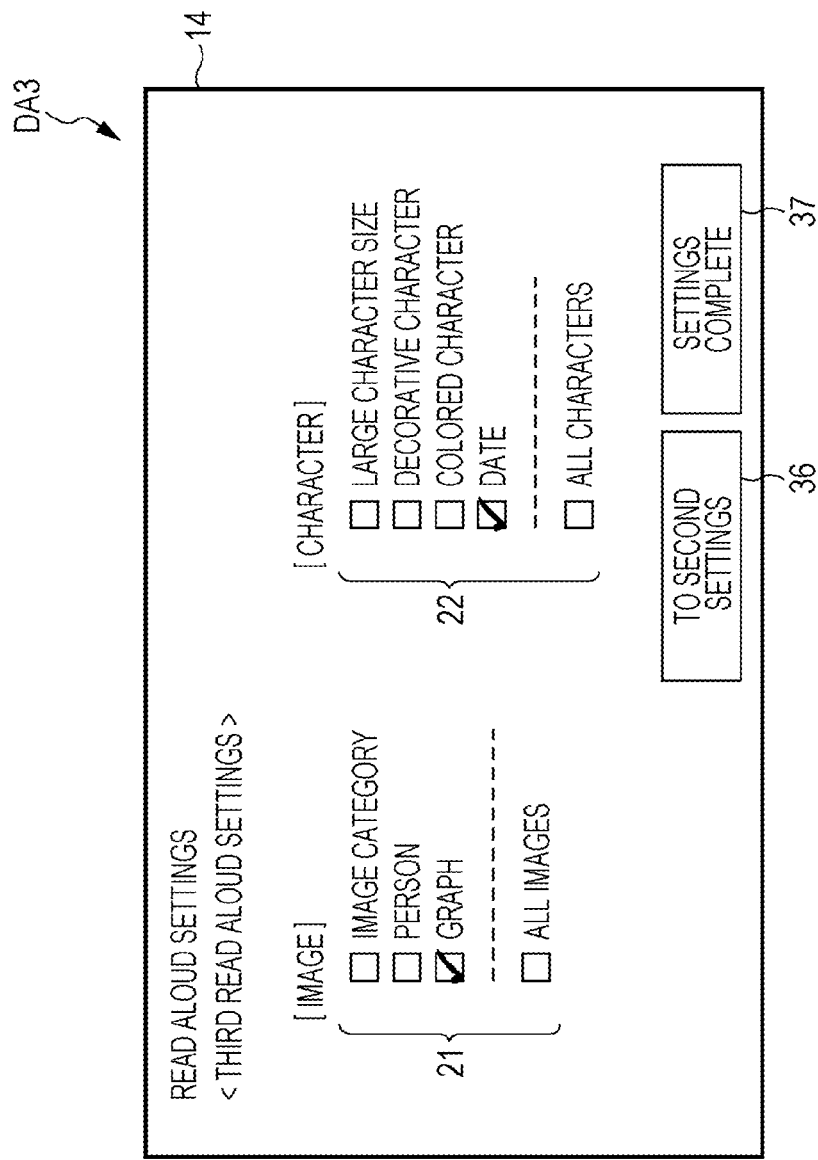
FIG. 6 is a diagram depicting a display example of a third setting screen.

With reference to FIGS. 4 to 6, the read-aloud-setting screens DA will now be described. As mentioned above, the read-aloud-setting screen DA is a screen for performing read aloud settings. The multi-function printer 1 according to the present embodiment allows read aloud settings to be performed at three stages. Hereinafter, the read aloud settings at the first stage will be referred to as first read aloud settings, the read aloud settings at the second stage will be referred to as second read aloud settings, and the read aloud settings at the third stage will be referred to as third read aloud settings. It is assumed that operations of the read-aloud-setting screen DA described above are performed by an able-bodied person without a visual impairment. However, a person having a visual impairment may be allowed to perform the operations when the multi-function printer 1 reads aloud information displayed on the read-aloud-setting screen DA.

In the scanning process described later, the multi-function printer 1 speaks a word according to the first read aloud settings when the pre-scan button 14*b* is operated for the first time. In the scanning process described later, the multi-function printer 1 also speaks a word according to the second read aloud settings when the pre-scan button 14*b* is operated for the second time. In the scanning process described later, the multi-function printer 1 also speaks a word according to the third read aloud settings when the pre-scan button 14*b* is operated for the third time. Additionally, in the present embodiment, when the pre-scan button 14*b* is operated for the first time, the multi-function printer 1 speaks a word according to the second read aloud settings if the original document 50 does not include a character or image that meets the first read aloud settings. The detailed description will be given for the scanning process (FIG. 8 to FIG. 11).

FIG. 4 is a diagram depicting an example of a display of a first read-aloud-setting screen DA1 for performing the first read aloud settings. On the first read-aloud-setting screen DA1, an image option group 21, a character option group 22, a first screen transition button 31, and a first setting completion button 32 are displayed.

In the image option group 21, any one or more among three options, "image category", "person", and "graph", or an option "all images" may be selected. In the character option group 22, any one or more among options "large character size", "decorative character", "colored character", and "date", or an option "all characters" may be selected.

For example, when the option "image category" of the image option group 21 is selected, the multi-function printer 1 speaks a word indicating the category of an image recognized by the image recognition section 120. That is, when the option "image category" of the image option group 21 is selected, the multi-function printer 1 speaks a "word indicating an image category" that is, in the image template storage area 13*b*, associated with the image template of the image recognized by the image recognition section 120.

When the option "person" of the image option group 21 is selected, the multi-function printer 1 speaks a word indicating the name of a person whose face has been recognized by the image recognition section 120. When the option "person" of the image option group 21 is selected, the multi-function printer 1 does not speak a "word indicating an image category" in the image template storage area 13*b*.

Similarly, when the option "graph" of the image option group 21 is selected, the multi-function printer 1 speaks a word indicating the type of a graph recognized by the image recognition section 120. When the option "graph" of the image option group 21 is selected, the multi-function printer 1 does not speak a "word indicating an image category" in the image template storage area 13*b*.

When the option "all images" of the image option group 21 is selected, the multi-function printer 1 speaks words indicating all the images recognized by the image recognition section 120, that is, "words indicating images" associated with the image templates of all the images recognized by the image recognition section 120 in the image template storage area 13*b*. When the option "all images" of the image option group 21 is selected, the multi-function printer 1 does not speak a "word indicating an image category" in the image template storage area 13*b*.

When the option "large character size" of the character option group 22 is selected, the multi-function printer 1 speaks large-size characters among the characters recognized by the image recognition section 120. When the option "decorative character" of the character option group 22 is selected, the multi-function printer 1 speaks decorative characters among the characters recognized by the image recognition section 120.

When the option "colored character" of the character option group 22 is selected, the multi-function printer 1 speaks colored characters among the characters recognized by the image recognition section 120. When the option "date" of the character option group 22 is selected, the multi-function printer 1 speaks characters indicating a date among the characters recognized by the image recognition section 120.

When the option "all characters" of the character option group 22 is selected, the multi-function printer 1 speaks words corresponding to all the characters recognized by the image recognition section 120, that is, words corresponding to all the characters recognized by performing the OCR process.

The term "large-size characters" refers to characters each having a size greater than or equal to a threshold value among the characters recognized by the image recognition section 120. Alternatively, relatively large characters among the characters recognized by the image recognition section 120, such as characters that are largest of the characters in a plurality of sizes recognized by the image recognition section 120, may be referred to as "large-size characters".

The term "decorative character" refers to a decorated character, such as an underlined character or a shaded character. The term "colored character" refers to a character of a color other than black or white. For example, the term "colored character" refers to a character of a color other than black for the case where the base color is white and refers to a character of a color other than white for the case where the base color is black. The phrase "characters indicating a date" refer to a combination of a number and a year or a fiscal year, a combination of the era name, a number, and a year, a one-digit or two-digit number and a month, a combination of a one-digit or two-digit number and a day, or the like.

In the present embodiment, it is assumed that, on the first read-aloud-setting screen DA1, the option "image category" of the image option group 21 and the option "large character size" of the character option group 22 are selected.

When the first screen transition button 31 is selected on the first read-aloud-setting screen DA1, the multi-function printer 1 displays a second read-aloud-setting screen DA2 (refer to FIG. 5). When the first setting completion button 32 is selected, the multi-function printer 1 causes the read-aloud-setting values that have been set on the read-aloud-setting screen DA to be stored in the setting value storage area 13*e*, completing the read aloud settings.

FIG. 5 is a diagram depicting a display example of the second read-aloud-setting screen DA2 for performing the second read aloud settings. On the second read-aloud-setting screen DA2, the image option group 21, the character option group 22, a second screen transition button 33, a third screen transition button 34, and a second setting completion button 35 are displayed. The options included in the image option group 21 and in the character option group 22 on the second read-aloud-setting screen DA2 are the same as those on the first read-aloud-setting screen DA1. As depicted in this figure, in the present embodiment, it is assumed that, on the second read-aloud-setting screen DA2, the option "person" of the image option group 21 and the option "decorative character" of the character option group 22 are selected.

When the second screen transition button 33 is selected on the second read-aloud-setting screen DA2, the multi-function printer 1 displays the first read-aloud-setting screen DA1. When the third screen transition button 34 is selected, the multi-function printer 1 displays a third read-aloud-setting screen DA3 (refer to FIG. 6). When the second setting completion button 35 is selected, the multi-function printer 1 causes the read-aloud-setting values that have been set on the read-aloud-setting screen DA to be stored in the setting value storage area 13*e*, completing the read aloud settings.

FIG. 6 is a diagram depicting a display example of the third read-aloud-setting screen DA3 for performing the third read aloud settings. On the third read-aloud-setting screen DA3, the image option group 21, the character option group 22, a fourth screen transition button 36, and a third setting completion button 37 are displayed. The options included in the image option group 21 and the character option group 22 on the third read-aloud-setting screen DA3 are the same as those on the first read-aloud-setting screen DA1. As depicted in this figure, in the present embodiment, it is assumed that, on the third read-aloud-setting screen DA3, the option "graph" of the image option group 21 and the option "date" of the character option group 22 are selected.

When the fourth screen transition button 36 is selected on the third read-aloud-setting screen DA3, the multi-function printer 1 displays the second read-aloud-setting screen DA2. When the third setting completion button 37 is selected, the multi-function printer 1 causes the read-aloud-setting values that have been set on the read-aloud-setting screen DA to be stored in the setting value storage area 13*e*, completing the read aloud settings.

Figure 7:
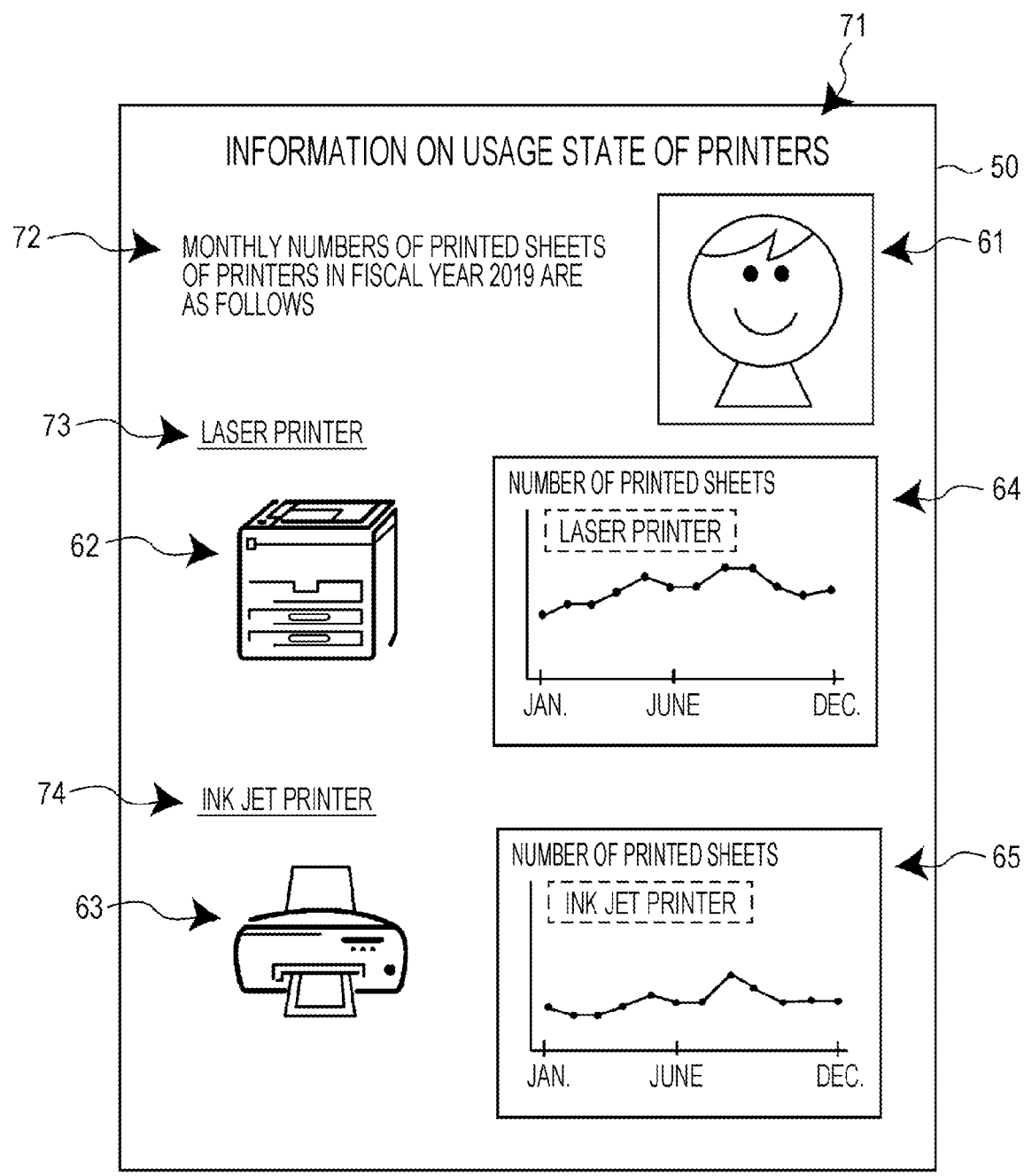
FIG. 7 is a diagram depicting an example of an original document.

With reference to FIG. 7, words spoken according to the settings on the read-aloud-setting screens DA depicted in FIGS. 4 to 6 will now be described. FIG. 7 is a diagram depicting an example of the original document 50. The original document 50 depicted in this figure includes a face image 61, which indicates the face of a person, a first printer image 62, which represents the appearance of a laser printer, a second printer image 63, which represents the appearance of an ink jet printer, a first graph image 64, which represents a graph of the monthly number of printed sheets of the laser printer, and a second graph image 65, which represents a graph of the monthly number of printed sheets of the ink jet printer. The original document 50 also includes a title character string 71, which represents a title, an explanation character string 72, which represents an explanation, a first item name character string 73, which represents an item name "laser printer", and a second item name character string 74, which represents an item name "ink jet printer".

When the read-aloud-setting values based on the read-aloud-setting screens DA depicted in FIGS. 4 to 6 are stored in the setting value storage area 13*e* and when the original document 50 depicted in FIG. 7 is scanned, the multi-function printer 1 speaks words as described below. In the example described below, it is assumed that the multi-function printer 1 speaks a "character" or an "image" before a word indicating characters or an image recognized by the image recognition section 120, so that the user may distinguish whether the characters are being read aloud or the image is being read aloud.

When the pre-scan button 14*b* is operated for the first time in the scanning process, the multi-function printer 1 speaks words indicating the image categories of the face image 61, the first printer image 62, the second printer image 63, the first graph image 64, and the second graph image 65 according to a selection result of the image option group 21 on the first read-aloud-setting screen DA1 (refer to FIG. 4). For example, the multi-function printer 1 speaks "image, person. image, appliance. image, appliance. image, graph. image, graph."

When the pre-scan button 14*b* is operated for the first time in the scanning process, the multi-function printer 1 also speaks the title character string 71 with a large character size according to a selection result of the character option group 22 of the first read-aloud-setting screen DA1 (refer to FIG. 4). For example, the multi-function printer 1 speaks "character, Information on usage state of printers."

In addition, when the pre-scan button 14*b* is operated for the second time in the scanning process, the multi-function printer 1 speaks a word indicating the name of a person of the face image 61 according to a selection result of the image option group 21 on the second read-aloud-setting screen DA2 (refer to FIG. 5). For example, when an image template indicating the face of the person of the face image 61 and "Taro Yamada", which is a word indicating the name of a person, are stored in association with each other in the image template storage area 13*b* (refer to FIG. 2), the multi-function printer 1 speaks "image, Taro Yamada."

When the pre-scan button 14*b* is operated for the second time in the scanning process, the multi-function printer 1 also speaks the first item name character string 73 and the second item name character string 74, which are decorative characters, according to a selection result of the character option group 22 on the second read-aloud-setting screen DA2 (refer to FIG. 5). For example, the multi-function printer 1 speaks "character, laser printer. character, ink jet printer."

When the pre-scan button 14*b* is operated for the third time in the scanning process, the multi-function printer 1 speaks words indicating the graph types of the first graph 64 and the second graph 65 according to a selection result of the image option group 21 on the third read-aloud-setting screen DA3 (refer to FIG. 6). For example, the multi-function printer 1 speaks "image, line graph. image, line graph." The multi-function printer 1 may speak characters included in the first graph image 64 and the second graph image 65, as well as the graph types. For example, according to the first graph image 64, the multi-function printer 1 may speak "image, line graph. laser printer, horizontal axis, January, June, December. vertical axis, number of printed sheets." The multi-function printer 1 may also speak the main points of graphs as well as the graph types. For example, according to the second graph image 65, the multi-function printer 1 may speak "image, line graph. The number of printed sheets peaks in August."

When the pre-scan button 14*b* is operated for the third time in the scanning process, the multi-function printer 1 also speaks the explanation character string 72 including characters indicating a date according to a selection result of the character option group 22 on the third read-aloud-setting screen DA3 (refer to FIG. 6). For example, the multi-function printer 1 speaks "character, The monthly numbers of printed sheets of printers in fiscal year 2019 are as follows." The multi-function printer 1 may speak only the characters indicating a date. For example, the multi-function printer 1 may speak "character, fiscal year 2019."

With reference to flowcharts in FIGS. 8 to 11, the flow of a scanning process will now be described. In response to detecting that the original document 50 is set on the platen of the image reading mechanism 16, the multi-function printer 1 starts the flowchart in FIG. 8. First, an operation of the pre-scan button 14*b* is periodically monitored until the operation of the pre-scan button 14*b* is detected. The scanning process described below refers to a process performed after the operation of the pre-scan button 14b. It is assumed that, prior to the scanning process, the multi-function printer 1 stores the setting values of the first read aloud settings, the second read aloud settings, and the third read aloud settings in the setting value storage area 13e. It is also assumed that the multi-function printer 1 stores the destination of main scan data in the destination storage area 13d.

In S01, the multi-function printer 1 determines whether the pre-scan button 14b has been operated. If the multi-function printer 1 determines that the pre-scan button 14b has been operated, the multi-function printer 1 proceeds to S02. If the multi-function printer 1 determines that the pre-scan button 14b has not been operated, the multi-function printer 1 repeats S01.

In S02, the multi-function printer 1 scans the original document 50 by using the image reading mechanism 16 to generate pre-scan data, which is image data as a reading result.

In S03, the multi-function printer 1 performs image recognition on the pre-scan data generated in S02. This leads to recognizing what image is included in the original document and creating a list of characters and images that meet the read aloud settings at each stage.

In S04, according to the list of characters and images that meet the read aloud settings at each stage, the multi-function printer 1 determines whether the original document 50 includes a character or image that meets the first read aloud settings. If the multi-function printer 1 determines that the original document 50 includes a character or image that meets the first read aloud settings, the multi-function printer 1 proceeds to S05. If, however, the multi-function printer 1 determines that the original document 50 does not include a character or image that meets the first read aloud settings, the multi-function printer 1 proceeds to S21 in FIG. 10.

In S05, the multi-function printer 1 speaks words corresponding to characters and images that meet the first read aloud settings.

In S11 in FIG. 9, the multi-function printer 1 determines whether the pre-scan button 14b has been operated again. The multi-function printer 1 determines the operation of the pre-scan button 14b performed for the second or subsequent time after the start of the scanning process, as a "reoperation of the pre-scan button 14b". If the multi-function printer 1 determines that the pre-scan button 14b has been operated again, the multi-function printer 1 proceeds to S21 in FIG. 10. If, however, the multi-function printer 1 determines that the pre-scan button 14b has not been operated again, the multi-function printer 1 proceeds to S12. For the case where the pre-scan button 14b has been operated again, that is, for the case of the second or subsequent operation of the pre-scan button 14b in the scanning process, the multi-function printer 1 will not scan the original document 50.

In S12, the multi-function printer 1 determines whether the main scan button 14c has been operated. If the multi-function printer 1 determines that the main scan button 14c has been operated, the multi-function printer 1 proceeds to S13. If, however, the multi-function printer 1 determines that the main scan button 14c has not been operated, the multi-function printer 1 proceeds to S15.

In S13, the multi-function printer 1 performs a main scan of the original document 50 by using the image reading mechanism 16 to generate main scan data. The main scan data is scan data with a higher resolution than the pre-scan data generated in S02 in FIG. 8. When various settings, such as a read resolution setting, are set before the main scan button 14c is operated, the multi-function printer 1 causes the generation of the main scan data in S13 to reflect the settings. However, the multi-function printer 1 causes the generation of the main scan data to reflect the default settings unless otherwise set.

In S14, the multi-function printer 1 transmits the main scan data generated in S13 to a specific destination. At this point, the multi-function printer 1 transmits the main scan data to a specified destination when the destination is specified by the user. The multi-function printer 1 transmits the main scan data to the default destination unless otherwise specified. If this destination is a printer, printing will be performed by the printer to which to transmit the main scan data.

In S15, the multi-function printer 1 determines whether the cancel button 14d has been operated. If the multi-function printer 1 determines that the cancel button 14d has been operated, the multi-function printer 1 terminates the scanning process. If the multi-function printer 1 determines that the cancel button 14d has not been operated, the multi-function printer 1 proceeds to S16.

In S16, the multi-function printer 1 determines whether a certain period of time has elapsed after completion of speaking. Here, the phrase "completion of speaking" refers to completion of speaking in S05 in FIG. 8. If the multi-function printer 1 determines that the certain period of time has elapsed after completion of speaking, the multi-function printer 1 terminates the scanning process. If, however, the multi-function printer 1 determines that the certain period of time has not elapsed after completion of speaking, the multi-function printer 1 returns to S11.

Figure 10:
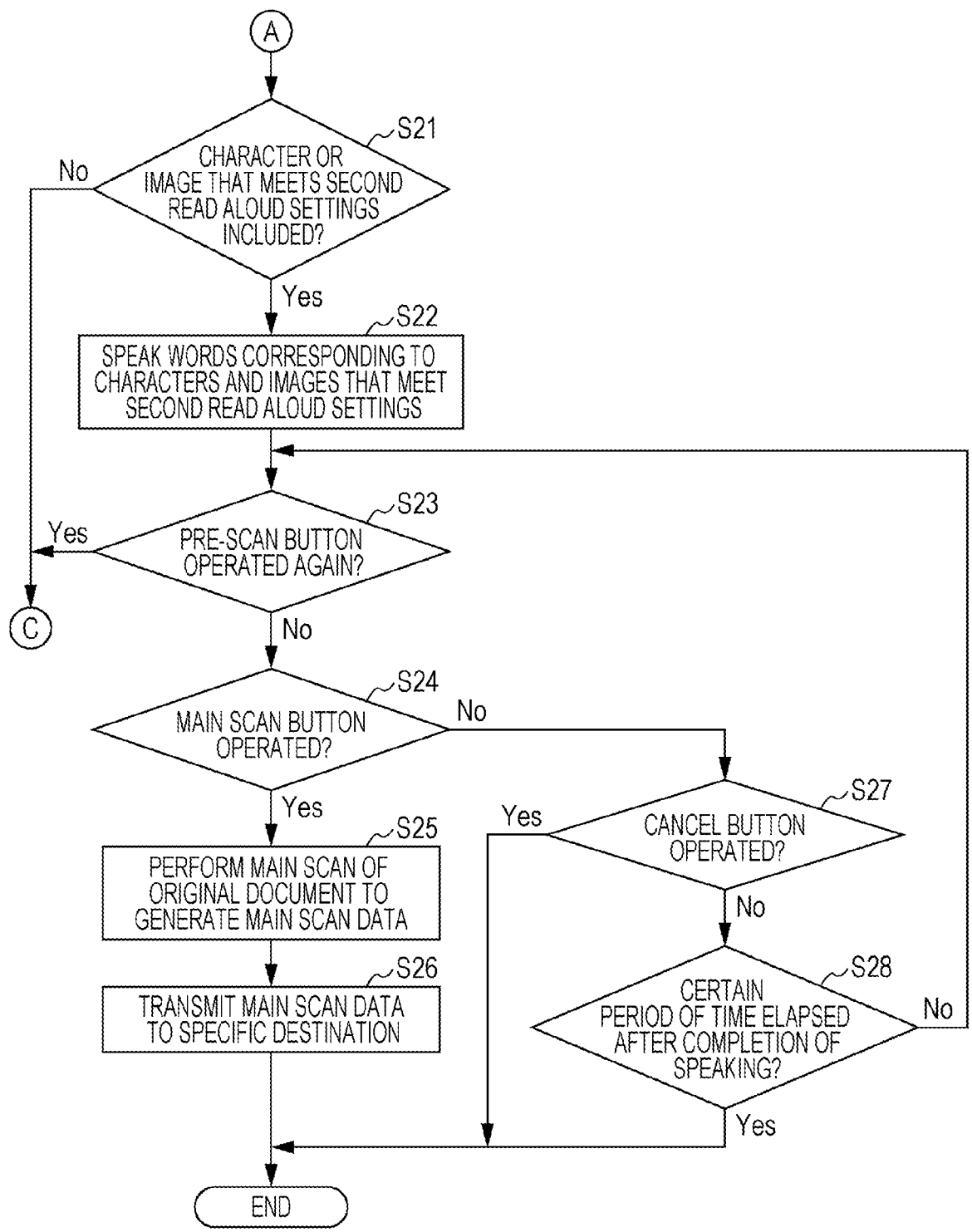
FIG. 10, which follows

In S21 in FIG. 10, according to a list of characters and images that meet read aloud settings at each stage, the multi-function printer 1 determines whether the original document 50 includes a character or image that meets the second read aloud settings. If the multi-function printer 1 determines that the original document 50 includes a character or image that meets the second read aloud settings, the multi-function printer 1 proceeds to S22. If the multi-function printer 1 determines that the original document 50 does not include a character or image that meets the second read aloud settings, the multi-function printer 1 proceeds to S31 in FIG. 11.

In S22, the multi-function printer 1 speaks words corresponding to characters and images that meet the second read aloud settings.

In S23, the multi-function printer 1 determines whether the pre-scan button 14b has been operated again. If the multi-function printer 1 determines that the pre-scan button 14b has been operated again, the multi-function printer 1 proceeds to S31 in FIG. 11. If, however, the multi-function printer 1 determines that the pre-scan button 14b has not been operated again, the multi-function printer 1 proceeds to S24.

In S24, the multi-function printer 1 determines whether the main scan button 14c has been operated. If the multi-function printer 1 determines that the main scan button 14c has been operated, the multi-function printer 1 proceeds to S25. If, however, the multi-function printer 1 determines that the main scan button 14c has not been operated, the multi-function printer 1 proceeds to S27.

In S25, the multi-function printer 1 performs a main scan of the original document 50 by using the image reading mechanism 16 to generate main scan data. For the other points, this step is the same as S13 in FIG. 9.

In S26, the multi-function printer 1 transmits the main scan data generated in S25 to the specific destination. For the other points, this step is the same as S14 in FIG. 9.

In S27, the multi-function printer 1 determines whether the cancel button 14d has been operated. If the multi-function printer 1 determines that the cancel button 14d has been operated, the multi-function printer 1 terminates the scanning process. If, however, the multi-function printer 1 determines that the cancel button 14d has not been operated, the multi-function printer 1 proceeds to S28.

In S28, the multi-function printer 1 determines whether a certain period of time has elapsed after completion of speaking. Here, the phrase "completion of speaking" refers to completion of speaking in S22. If the multi-function printer 1 determines that the certain period of time has elapsed after completion of speaking, the multi-function printer 1 terminates the scanning process. If the multi-function printer 1 determines that the certain period of time has not elapsed after completion of speaking, the multi-function printer 1 returns to S23.

Figure 11:
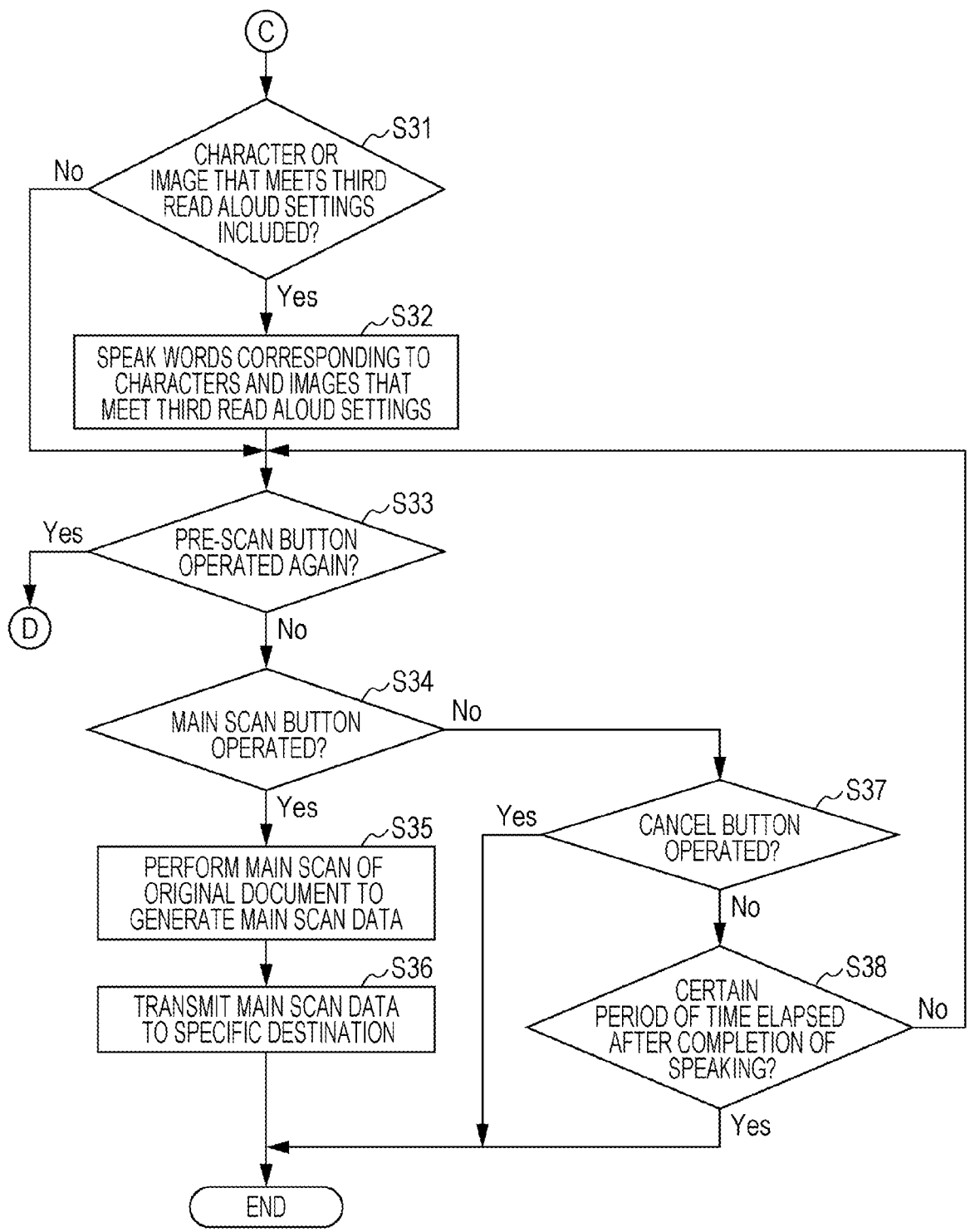
FIG. 11, which follows

In S31 in FIG. 11, according to the list of the characters and images that meet the read aloud settings at each stage, the multi-function printer 1 determines whether the original document 50 includes a character or image that meets the third read aloud settings. If the multi-function printer 1 determines that the original document 50 includes a character or image that meets the third read aloud settings, the multi-function printer 1 proceeds to S32. If, however, the multi-function printer 1 determines that the original document 50 does not include a character or image that meets the third read aloud settings, the multi-function printer 1 proceeds to S33.

In S32, the multi-function printer 1 speaks words corresponding to characters and images that meet the third read aloud settings.

In S33, the multi-function printer 1 determines whether the pre-scan button 14b has been operated again. If the multi-function printer 1 determines that the pre-scan button 14b has been operated again, the multi-function printer 1 proceeds to S04 in FIG. 8. If, however, the multi-function printer 1 determines that the pre-scan button 14b has not been operated again, the multi-function printer 1 proceeds to S34.

In S34, the multi-function printer 1 determines whether the main scan button 14c has been operated. If the multi-function printer 1 determines that the main scan button 14c has been operated, the multi-function printer 1 proceeds to S35. If, however, the multi-function printer 1 determines that the main scan button 14c has not been operated, the multi-function printer 1 proceeds to S37.

In S35, the multi-function printer 1 performs a main scan of the original document 50 by using the image reading mechanism 16 to generate main scan data. For the other points, this step is the same as S13 in FIG. 9.

In S36, the multi-function printer 1 transmits the main scan data generated in S35 to the specific destination. For the other points, this step is the same as S14 in FIG. 9.

In S37, the multi-function printer 1 determines whether the cancel button 14d has been operated. If the multi-function printer 1 determines that the cancel button 14d has been operated, the multi-function printer 1 terminates the scanning process. If, however, the multi-function printer 1 determines that the cancel button 14d has not been operated, the multi-function printer 1 proceeds to S38.

In S38, the multi-function printer 1 determines whether a certain period of time has elapsed after completion of speaking. Here, the phrase "completion of speaking" refers to completion of speaking in S32 when S32 is executed, and refers to the time at which the pre-scan button 14b was last operated, when S32 is not executed. If the multi-function printer 1 determines that the certain period of time has elapsed after completion of speaking, the multi-function printer 1 terminates the scanning process. If the multi-function printer 1 determines that the certain period of time has not elapsed after completion of speaking, the multi-function printer 1 returns to S33.

As described above, the multi-function printer 1 according to the present embodiment may perform image recognition on scan data obtained by scanning the original document 50 and cause words corresponding to a result of the image recognition to be spoken from the speaker circuit 17.

The multi-function printer 1 may also cause words corresponding to an image recognition result for various kinds of content included in the original document 50 to be spoken from the speaker circuit 17. Therefore, the user who is operating the multi-function printer 1 may grasp information other than the characters included in the original document 50. The user may also issue an instruction for the main scan after grasping information included in the original document 50, and therefore the user may reduce scanning mistakes, such as accidentally scanning the original document 50 that is not desired to be scanned. In particular, the effects are large in such a case where the original document 50 includes only a photograph or a picture and does not use a character.

When the main scan button 14c is operated within a certain period of time after completion of speaking in the speaking process, the multi-function printer 1 may generate main scan data and transmit the generated main scan data to a specific destination. That is, the user may transmit main scan data to a specific destination by a simple operation of just operating the main scan button 14c.

Irrespective of the embodiment described above, modifications described below may be employed.

First Modification

Although, in the embodiment described above, the multi-function printer 1 reads the original document 50 aloud in the scanning process, the multi-function printer 1 may read the original document 50 aloud in the copying process. In this case, the multi-function printer 1 may copy the original document 50 when, instead of an instruction for a main scan, an instruction for copying is received.

Second Modification

What image in the original document 50 to read aloud and how to read aloud the image, as well as what category the read aloud settings may be set in, are not limited to the embodiment described above. For example, a logo without a character may be read aloud as "the logo mark of ABC Corporation", for example. The language in which to perform reading aloud is a language set as the system language. However, when it is determined as a result of analyzing the characters in the original document 50 that the original document 50 is a document in another language, reading aloud may be performed in the determined language. For example, an image may be read aloud in the system language, and subsequently an image may be read aloud in the determined language. Similarly, for the case of reading characters aloud, the characters may be translated into the system language and be read aloud, and subsequently the characters may be read aloud in the determined language. Of course, the order of reading aloud is arbitrary and is not limited to this.

Third Modification

When a plurality of characters and images that meet the same read aloud settings are included in the original document 50, the order in which words corresponding to the characters and images are read aloud may be designed appropriately insofar that the user easily understand the words. For example, the original document 50 may be read aloud from the top left toward the bottom right when the original document 50 is determined to be a horizontally written document, whereas the original document 50 may be read aloud from the top right toward the bottom left when the original document 50 is determined to be a vertically written document.

Fourth Modification

Although, in the embodiment described above, when an instruction for the main scan is received, the multi-function printer 1 performs a main scan of the original document 50, the main scan may be omitted. In this case, the multi-function printer 1 may begin a scanning process to generate main scan data when an instruction for scanning is received, perform image recognition using the generated main scan data, and transmit the generated main scan data to a specific destination when an instruction for transmission is received.

Fifth Modification

Although, in the embodiment described above, the multi-function printer 1 generates main scan data and transmits the generated main scan data to a specific destination when an instruction for a main scan is received within a certain period of time after completion of speaking, the instruction for a main scan may be received during speaking in the speaking process. That is, when an instruction for a main scan is received during speaking in the speaking process, the multi-function printer 1 may also generate main scan data and transmit the generated main scan data to a specific destination.

Sixth Modification

Although, in the embodiment described above, the multi-function printer 1 transmits main scan data to the specific storage area in the external device, a PC email address may be set as the destination to which to transmit the main scan data. The PC email address is an example of the specific destination.

In a further modification, an external storage medium attachable to or detachable from the multi-function printer 1 or an information processing terminal, such as a smart phone, carried by the user who is operating the multi-function printer 1 may be set as a "specific destination".

Seventh Modification

Although, in the embodiment described above, when an instruction for the second operation of the pre-scan button is received, the multi-function printer 1 speaks words corresponding to characters and images that meet the second read aloud settings, the multi-function printer 1 may speak words including the words corresponding characters and images that meet the first read aloud settings. That is, the multi-function printer 1 may speak words corresponding to characters and images that meet the first read aloud settings and the second read aloud settings when an instruction for the second operation of the pre-scan button is received, and may speak words corresponding to characters and images that meet the first read aloud settings, the second read aloud settings, and the third read aloud settings when an instruction for the third operation of the pre-scan button is received. However, when the option "all images" is selected in the image option group 21, it is desirable to omit to speak a word that meets another image option and that is an overlapping word. Similarly, when the option "all characters" is selected in the character option group 22, it is desirable to omit to speak a word that meets another character option and that is an overlapping word.

Eighth Modification

Although if it is determined that the original document 50 does not include a character or image that meets the first read aloud settings, that is, if No in S04 in FIG. 8, the multi-function printer 1 proceeds to S21 in FIG. 10, the multi-function printer 1 may speak a message indicating the determination and then proceed to S21. Similarly, if No in S21 in FIG. 10, the multi-function printer 1 may speak a message indicating that the original document 50 does not include a character or image that meets the second read aloud settings, and if No in S31 in FIG. 11, the multi-function printer 1 may speak a message indicating that the original document 50 does not include a character or image that meets the third read aloud settings.

Ninth Modification

Although, in the embodiment described above, the scanning process is terminated when the cancel button 14*d* is operated in the middle of the scanning process, the scan processing may be terminated when the original document 50 is removed from the platen of the image reading mechanism 16.

Tenth Modification

Although, in the embodiment described above, the multi-function printer 1 proceeds to the next processing by the pre-scan button 14*b* being pressed under the condition that it is detected that the original document 50 is set on the platen of the image reading mechanism 16, the multi-function printer 1 may proceed to S13 when it is determined that the main scan button 14*c* is operated, without pressing the pre-scan button 14*b*, under the condition that it is detected that the original document 50 is set on the platen of the image reading mechanism 16.

Eleventh Modification

Although, in the embodiment described above, the multi-function printer 1 is exemplified as the scanning system, the scanning system may be implemented by the multi-function printer 1 and a server. In this case, among the functions illustrated in FIG. 3, all or a part of the image recognition section 120 may be provided in the server, and the other functions may be provided in the multi-function printer 1. Additionally, instead of the server, an information processing terminal, such as a smart phone, may be used. That is, the scanning system may be implemented by the multi-function printer 1 and the information processing terminal.

Twelfth Modification

The scanning system may be an electronic device other than the multi-function printer 1. As the electronic device, a scanner, a copier, a projector, a document camera, or a camera-equipped information processing terminal, may be used. For example, when a projector is used as the scanning system, the projected original document 50 may be read aloud. When a document camera and a camera-equipped information processing terminal are used as the scanning system, the original document 50 may be captured by a camera and the captured image data may be used instead of scan data.

In addition, appropriate changes may be made without departing from the spirit and scope of the present disclosure.

APPENDICES

Hereinafter, appendices for a scanning system, a non-transitory computer-readable storage medium storing a program, and a method for generating scan data in the scanning system will be provided.

The scanning system includes the generating section 110 that scans the original document 50 to generate scan data, the image recognition section 120 that performs image recognition on the scan data, and the speaking section 130 that causes a word corresponding to a photograph, picture, or drawing corresponding to any of a photograph, a picture, and a drawing included in the original document 50 to be spoken from the speaker circuit 17. The word corresponding to a photograph, picture, or drawing is a word corresponding to a recognition result of the image recognition section 120.

The program causes the scanning system to execute a process. The process includes scanning the original document 50 to generate scan data, performing image recognition on the scan data, and causing a word corresponding to a photograph, picture, or drawing corresponding to any of a photograph, a picture, and a drawing included in the original document 50 to be spoken from the speaker circuit 17. The word corresponding to a photograph, picture, or drawing is a word corresponding to a recognition result of the image recognition.

In the method for generating scan data in the scanning system, the method includes scanning the original document 50 to generate scan data, performing image recognition on the scan data, and speaking a word corresponding to a photograph, picture, or drawing corresponding to any of a photograph, a picture, and a drawing included in the original document 50 to be spoken from the speaker circuit 17. The word corresponding to a photograph, picture, or drawing is a word corresponding to a recognition result of the image recognition.

According to this configuration, the scanning system may cause a photograph, picture, or drawing corresponding word corresponding to any of a photograph, a picture, and a drawing included in the original document 50 to be spoken from the speaker circuit 17. The photograph, picture, or drawing corresponding word is a word corresponding to an image recognition result.

In the scanning system described above, when the original document 50 includes the face of a person, the image recognition section 120 may recognize the face of the person, and the speaking section 130 may reference the image template storage area 13*b* in which, for every person, the image data of a face and a word indicating a name are stored in association with each other and may cause a word indicating the name of the person whose face is recognized by the image recognition section 120 to be spoken, as the word corresponding to a photograph, picture, or drawing, from the speaker circuit 17.

According to this configuration, the scanning system may cause a word indicating the name of a person whose face is recognized by the image recognition section 120 to be spoken, as the photograph, picture, or drawing corresponding word, from the speaker circuit 17.

In the scanning system described above, when the original document 50 includes a graph, the image recognition section 120 may recognize a type of the graph, and the speaking section 130 may reference the image template storage area 13*b* in which, for every type of the graph, image data of the graph and a word indicating the type of the graph are stored in association with each other and may cause a word indicating the type of the graph recognized by the image recognition section 120 to be spoken, as the word corresponding to a photograph, picture, or drawing, from the speaker circuit 17.

According to this configuration, the scanning system may cause a word indicating the type of a graph recognized by the image recognition section 120, as the photograph, picture, or drawing corresponding word, from the speaker circuit 17.

In the scanning system described above, when the original document 50 includes at least one image, the image recognition section 120 may recognize the category of the at least one image, and the speaking section 130 may reference the image template storage area 13*b* in which, for every one of the at least one image, image data and a word indicating the category of an image are stored in association with each other, and may cause a word indicating the category of the at least one image recognized by the image recognition section 120 to be spoken, as the word corresponding to a photograph, picture or drawing, from the speaker circuit 17.

According to this configuration, the scanning system may cause a word indicating the classification of an image recognized by the image recognition section 120 to be spoken, as the photograph, picture, or drawing corresponding word, from the speaker circuit 17.

In the scanning system described above, when the original document 50 includes a character, the image recognition section 120 may recognize the character by performing the OCR process, and the speaking section 130 may cause a word corresponding to the character recognized by the image recognition section 120 to be further spoken from the speaker circuit 17.

According to this configuration, the scanning system may cause a word corresponding to characters recognized by performing the OCR process to be spoken from the speaker circuit 17.

In the scanning system described above, the generating section 110 may generate first scan data and second scan data, and the image recognition section 120 may perform image recognition on the first scan data. The scanning system may further include the transmitting section 140 that transmits the second scan data to a specific destination when a specific operation is performed during speaking performed by the speaking section 130 or within a certain period of time after completion of the speaking performed by the speaking section 130.

According to this configuration, when a specific operation is performed during speaking performed by the speaking section 130 or within a certain period of time after completion of speaking performed by the speaking section 130, the scanning system may transmit the second scan data to a specific destination.

A scanning system includes the generating section 110 that scans the original document 50 to generate scan data, the image recognition section 120 that performs image recognition on the scan data, and the speaking section 130 that causes a word not corresponding to a character or code to be spoken from the speaker circuit 17. The word not corresponding to a character or code is a word that corresponds to a recognition result of the image recognition section 120 and that is neither a word corresponding to a character included in the original document 50 nor a word corresponding to code included in the original document 50.

According to this configuration, the scanning system may cause a word not corresponding to a character or code, which is a word that corresponds to an image recognition result and that is neither a word corresponding to a character included in the original document 50 nor a word corresponding to code included in the original document 50, to be spoken from the speaker circuit 17.

What is claimed is:

1. A scanning system comprising:
    a processor configured to scan an original document to generate scan data,
    the processor being further configured to perform image recognition on the scan data, and
    the processor being further configured to, in response to sequentially receiving a plurality of user inputs, sequentially cause a plurality of words corresponding to a photograph, picture, or drawing that correspond to any of a photograph, a picture, and a drawing included in the original document to be spoken from a speaker circuit based on a plurality of different read-aloud-settings indicative of different metadata of a photograph, a picture, or a drawing to be spoken, respectively, the words corresponding to a photograph, picture, or drawing being a word corresponding to an image recognition result of the image recognition.

2. The scanning system according to claim 1, wherein when the original document includes a face of a person, the processor
    recognizes the face of the person, and
    references a storage portion in which, for every person, a face and a name are stored in association with each other and causes a word indicating a name of the person whose face is recognized by the processor to be spoken, as the words corresponding to a photograph, picture, or drawing, from the speaker circuit.

3. The scanning system according to claim 1, wherein when the original document includes a graph, the processor
    recognizes a type of the graph, and
    references a storage portion in which, for every type of the graph, the graph and a word indicating a type of the graph are stored in association with each other and causes a word indicating the type of the graph recognized by the processor to be spoken, as the words corresponding to a photograph, picture, or drawing, from the speaker circuit.

4. The scanning system according to claim 1, wherein when the original document includes at least one image, the processor
    recognizes a category of the at least one image, and
    references a storage portion in which, for every one of the at least one image, a category of an image and a word indicating the category of an image are stored in association with each other and causes a word indicating the category of the at least one image recognized by the processor to be spoken, as the words corresponding to a photograph, picture, or drawing, from the speaker circuit.

5. The scanning system according to claim 1, wherein when the original document includes a character, the processor
    recognizes the character by performing an optical character recognition process, and
    causes a word corresponding to the character recognized by the processor to be further spoken from the speaker circuit.

6. The scanning system according to claim 1, wherein the processor
    generates first scan data and second scan data,
    performs image recognition on the first scan data, and
    transmits the second scan data to a specific destination when a specific operation is performed during speaking performed by the processor or within a certain period of time after completion of the speaking performed by the processor.

7. A non-transitory computer-readable storage medium storing a program for causing a scanning system to execute a process, the process comprising:
    scanning an original document to generate scan data;
    performing image recognition on the scan data; and
    in response to sequentially receiving a plurality of user inputs, sequentially causing a plurality of words corresponding to a photograph, picture, or drawing that correspond to any of a photograph, a picture, and a drawing included in the original document to be spoken from a speaker circuit based on a plurality of different read-aloud-settings indicative of different metadata of a photograph, a picture, or a drawing to be spoken, respectively, the words corresponding to a photograph, picture, or drawing being a word corresponding to an image recognition result of the image recognition.

8. A method for generating scan data in a scanning system, the method comprising:
    scanning an original document to generate scan data;
    performing image recognition on the scan data; and
    in response to sequentially receiving a plurality of user inputs, sequentially causing a plurality of words corresponding to a photograph, picture, or drawing that correspond to any of a photograph, a picture, and a drawing included in the original document to be spoken from a speaker circuit based on a plurality of different read-aloud-settings indicative of different metadata of a photograph, a picture, or a drawing to be spoken, respectively, the words corresponding to a photograph, picture, or drawing being a word corresponding to an image recognition result of the image recognition.

* * * * *